US012802152B2

(12) United States Patent
Shu et al.

(10) Patent No.: US 12,802,152 B2
(45) Date of Patent: Nov. 17, 2026

(54) ACTIVE-DEFENSE DETECTION METHOD BASED ON FACIAL LANDMARK WATERMARKING

(71) Applicants: Qilu University of Technology (Shandong Academy of Sciences), Jinan (CN); Shandong Artificial Intelligence Institute, Jinan (CN); SHANDONG COMPUTER SCIENCE CENTER (NATIONAL SUPERCOMPUTING CENTER IN JINAN), Jinan (CN)

(72) Inventors: Minglei Shu, Jinan (CN); Mengxiao Huang, Jinan (CN); Shuwang Zhou, Jinan (CN); Zhaoyang Liu, Jinan (CN); Pengyao Xu, Jinan (CN)

(73) Assignees: QILU UNIVERSITY OF TECHNOLOGY (SHANDONG ACADEMY OF SCIENCES), Jinan (CN); SHANDONG ARTIFICIAL INTELLIGENCE INSTITUTE, Jinan (CN); SHANDONG COMPUTER SCIENCE CENTER (NATIONAL SUPERCOMPUTING CENTER IN JINAN), Jinan (CN)

( * ) Notice: Subject to any disclaimer, the term of this patent is extended or adjusted under 35 U.S.C. 154(b) by 251 days.

(21) Appl. No.: 18/755,736

(22) Filed: Jun. 27, 2024

(65) Prior Publication Data

US 2025/0166111 A1 May 22, 2025

(30) Foreign Application Priority Data

Nov. 22, 2023 (CN) ........................ 202311561214.1

(51) Int. Cl.
*G06T 1/00* (2006.01)
*G06N 3/0455* (2023.01)
(Continued)

(52) U.S. Cl.
CPC ............ *G06T 1/005* (2013.01); *G06V 40/168* (2022.01); *G06V 40/40* (2022.01)

(58) Field of Classification Search
CPC ............ G06T 1/005; G06T 2201/0065; G06V 40/168; G06V 40/40; G06V 10/454;
(Continued)

(56) References Cited

U.S. PATENT DOCUMENTS 10,322,728 B1 * 6/2019 Porikli .................. G06V 10/80
2007/0237354 A1 * 10/2007 Zhou .................. H04N 1/3217 382/159
(Continued)

OTHER PUBLICATIONS

Kelvin Lin, Large Scale Semantic Image Inpainting With Progressively Grown Gans, May 8, 2020, the Cooper Union for the Advancement of Science and Art (Year: 2020).*
(Continued)

*Primary Examiner* — Chineyere Wills-Burns
*Assistant Examiner* — Lucius Cameron Green Allen
(74) *Attorney, Agent, or Firm* — Bayramoglu Law Offices LLC

(57) ABSTRACT

An active-defense detection method based on facial landmark watermarking is provided. The active-defense detection method includes: extracting facial landmarks from an original image, converting the extracted facial landmarks into a binary watermark, embedding the binary watermark into the original image to form a watermark image, and subjecting the watermark image to a non-malicious/malicious operation to form a noise image or a malicious image such that a model is robust to the non-malicious/malicious
(Continued)

operation. By introducing the facial landmarks, the active-defense detection method can generate a unique watermark for each individual and achieve traceability and detection functions.

8 Claims, 4 Drawing Sheets

(51) Int. Cl.
*G06N 3/0464* (2023.01)
*G06V 10/44* (2022.01)
*G06V 10/77* (2022.01)
*G06V 10/82* (2022.01)
*G06V 20/00* (2022.01)
*G06V 40/16* (2022.01)
*G06V 40/40* (2022.01)

(58) Field of Classification Search
CPC .... G06V 10/82; G06V 10/7715; G06V 20/95; G06V 40/171; G06N 3/0455; G06N 3/0464
USPC .......................................................... 382/118
See application file for complete search history.

(56) References Cited

U.S. PATENT DOCUMENTS

2008/0002852 A1* 1/2008 Dixit .................. H04N 1/32288
382/100
2021/0019605 A1* 1/2021 Rouhani ............... G06F 18/213
2023/0215063 A1* 7/2023 Gadiyar ................. G06V 10/22
382/128
2024/0386096 A1* 11/2024 DiValentin ............ G06F 21/552
2024/0394827 A1* 11/2024 Guo ................... H04N 1/32235
2025/0217918 A1* 7/2025 Hussain ................ G06T 1/0042

OTHER PUBLICATIONS

C. Fei, R. Kwong and D. Kundur, "Secure semi-fragilewatermarking for image authentication," 2009 First IEEE International Workshop on Information Forensics and Security (WIFS), London, UK, 2009, (Year: 2009).*

Jiancan Zhou et al., UniFace: Unified Cross-Entropy Loss for Deep Face Recognition, Mar. 8, 2023, Computer Vision Foundation (Year: 2023).*

Chao Xu, et al., Designing One Unified Framework for High-Fidelity Face Reenactment and Swapping, Uniface, pp. 1-17.

Gege Gao, et al., Information Bottleneck Disentanglement for Identity Swapping, CVF, 2021, pp. 3404-3413.

Zhaoyang Jia, et al., MBRS : Enhancing Robustness of DNN-basedWatermarking by Mini-Batch of Real and Simulated JPEG Compression, MM '21, 2021, pp. 41-49.

Renwang Chen, et al., SimSwap: An Efficient Framework For High Fidelity Face Swapping, MM '20, 2020, pp. 2003-2011.

Yunjey Choi, et al., StarGAN: Unified Generative Adversarial Networks for Multi-Domain Image-to-Image Translation, CVF, pp. 8789-8797.

* cited by examiner

ACTIVE-DEFENSE DETECTION METHOD BASED ON FACIAL LANDMARK WATERMARKING

CROSS-REFERENCE TO THE RELATED APPLICATIONS

This application is based upon and claims priority to Chinese Patent Application No. 202311561214.1, filed on Nov. 22, 2023, the entire contents of which are incorporated herein by reference.

TECHNICAL FIELD

The present disclosure relates to the field of Deepfake detection, and in particular to an active-defense detection method based on facial landmark watermarking.

BACKGROUND

In recent years, Deepfake technology has entered an increasing number of fields in academia and industry, and has been widely used in multimedia forms such as video, audio, and images to generate fake multimedia products, resulting in various legal and ethical issues. In order to combat the aggressiveness of Deepfake technology, a new research branch called Deepfake detection has emerged. Currently, Deepfake detection mainly focuses on passive detection, that is, detection by artifacts in fake faces after generation. Passive detection methods usually only rely on passive defense and ex-post evidence collection when detecting deeply faked images or videos. This means that they cannot prevent the generation and propagation of deepfakes, and cannot avoid the potential harm caused by fake content.

At present, in methods based on semi-fragile watermarks, a watermark can be used to detect authenticity but cannot achieve tracing. In addition, in methods based on robust watermarks, the watermark embedded into the image is a randomly generated or fixed watermark, and unique watermarks cannot be generated for each individual.

SUMMARY

In order to overcome the above shortcomings in the prior art, the present disclosure provides an active-defense detection method based on facial landmark watermarking, which can generate unique watermarks for each individual and achieve traceability and detection functions.

In order to solve the technical problem, the present disclosure adopts the following technical solution.

The active-defense detection method based on facial landmark watermarking includes the following steps:

a) acquiring n facial images to form a facial image set I, $I=\{I_1, I_2, \ldots, I_i, \ldots, I_n\}$ where $I_i$ denotes an i-th facial image, $i \in \{1, \ldots, n\}$; and preprocessing the i-th facial image $I_i$, $i \in \{1, \ldots, n\}$, to acquire a preprocessed i-th facial image $I_{cover\_i}$, thereby acquiring a preprocessed facial image set $I_{cover}$;

b) extracting facial landmarks from the preprocessed i-th facial image $I_{cover\_i}$, and converting the facial landmarks into a watermark $W_m$;

c) constructing an encoder, and inputting the i-th facial image $I_{cover\_i}$ and the watermark $W_m$ into the encoder to acquire a watermark image $I_{wm}$;

d) injecting the watermark image $I_{wm}$ into a noise pool to acquire a noise image $I_{noise}$, and injecting the watermark image $I_{wm}$ into a malicious pool to acquire a malicious image $I_{dep}$;

e) constructing a decoder, and inputting the noise image/noise or the malicious image $I_{dep}$ into the decoder to acquire a final watermark $W_{ml}$; and f) determining whether the noise image $I_{noise}$ and the malicious image $I_{dep}$ are real or fake images based on the final watermark $W_{ml}$.

Further, the step a) includes:

a-1) acquiring the n facial images from a CelebA-HQ dataset to form the facial image set I; and a-2) resizing, by a resize function in a Python imaging library (PIL), the i-th facial image I; into a 256×256 image, thereby acquiring the preprocessed i-th facial image $I_{cover\_i}$ and facial acquiring the preprocessed image set $I_{cover}=\{I_{cover\_1}, I_{cover\_2}, \ldots, I_{cover\_i}, \ldots, I_{cover\_n}\}$.

Further, the step b) includes:

b-1) detecting, by a Dlib facial landmark detection algorithm, the facial landmarks in the preprocessed i-th facial image $I_{cover\_i}$ to acquire a facial landmark set $L_m$ including m facial landmarks, $L_m=\{l_1, l_2, \ldots, l_m\}$, are landmarks of a facial landmarks, $L_m=\{1, 2, \ldots, 1\}$, m=68, where jawline, $\{l_{18}, l_{19}, \ldots, l_{22}\}$ are landmarks of a right eyebrow, $\{l_{23}, l_{24}, \ldots, l_{27}\}$ are landmarks of a left eyebrow, $\{l_{28}, l_{29}, \ldots, l_{36}\}$ are landmarks of a nose, $\{l_{37}, l_{38}, \ldots, l_{42}\}$ are landmarks of a right eye, $\{l_{43}, l_{44} \ldots, l_{48}\}$ are landmarks of a left eye, and $\{l_{49}, l_{50}, \ldots, l_{68}\}$ are landmarks of a mouth; and b-2) defining an i-th landmark $l_i$ by a horizontal coordinate $X_i$ and a vertical coordinate $y_i$; mapping a value of the horizontal coordinate X; to an integer range of 0-15 through a linear transformation, and converting, by a bin function in Python®, the value into a binary representation $W_{x_i}$ with a length of 4; mapping a value of the vertical coordinate $y_i$ to an integer range of 0-15 through a linear transformation, and converting, by the bin function in Python®, the value into a binary representation $W_{y_i}$ with a length of 4; splicing representation $W_{x_i}$ and the binary representation $W_{y_i}$ into a binary representation $W_{xy\_i}$ with a length of 8; splicing binary representations of the 68 facial landmarks together into a binary representation $W_{68}$ with a length of 544; and compressing, by a principal component analysis (PCA)-based dimensionality reduction method, the binary representation $W_{68}$ to a binary representation with a length of 256 as the watermark $W_m$.

Further, the step c) includes:

c-1) constructing the encoder, including an original image processing unit, a watermark processing unit, a first convolutional layer, a batch normalization (BatchNorm) layer, an activation function layer, and a second convolutional layer;

c-2) constructing the original image processing unit of the encoder, including a convolutional layer, a BatchNorm layer, a first rectified linear unit (ReLU) activation function, an atrous convolutional layer, a second ReLU activation function, a Dropout layer, a first combined pooling and convolution (CPC) module, a second CPC module, and a third CPC module; inputting the i-th facial image $I_{cover\_i}$ into the convolutional layer, the BatchNorm layer, and the first ReLU activation function of the original image processing unit in sequence to acquire an image feature $F_{cover\_1}$; and inputting the image feature $F_{cover\_1}$ into the atrous convolutional layer, the second ReLU activation function, and the Dropout layer of the original image processing unit in sequence to acquire an image feature $F_{cover\_2}$, c-3) constructing the first CPC module, the second CPC module, and the third CPC module, each including a first branch and a second branch, where the first branch includes a first convolutional layer, a first BatchNorm layer, a first ReLU activation function, a second convolutional layer, a second BatchNorm layer, a second ReLU activation function, a third convolutional layer, a third BatchNorm layer, and a third ReLU activation function in sequence, while the second branch includes an average pooling layer, a first convolutional layer, a ReLU activation function, and a second convolutional layer in sequence; inputting the image feature $F_{cover\_2}$ into the first convolutional layer, the first BatchNorm layer, and the first ReLU activation function in the first branch of the first CPC module in sequence to acquire an image feature $F_{cover\_2\_1}$; inputting the image feature $F_{cover\_2\_1}$ into the second convolutional layer, the second BatchNorm layer, and the second ReLU activation function in the first branch of the first CPC module in sequence to acquire an image feature $F_{cover\_2\_2}$ cover inputting the image feature $F_{cover\_2\_2}$ into the third convolutional layer, the third BatchNorm layer, and the third ReLU activation function in the first branch of the first CPC module in sequence to acquire an image feature $F_{cover\_2\_3}$; inputting the image feature $F_{cover\_2}$ into the second branch of the first CPC module to acquire an image feature $F_{cover\_3}$; subjecting the image feature $F_{cover\_3}$ and the image feature $F_{cover\_2\_3}$ to element-wise multiplication to acquire an image feature $F_{cover\_4}$; subjecting the image feature to $F_{cover\_4}$ and the image feature $F_{cover\_2}$ corresponding-elements addition to acquire an image feature $F_{cover\_8}$; inputting the image $F_{cover\_5}$ into the first convolutional layer, the first BatchNorm layer, and the first ReLU activation function in the first branch of the second CPC module in sequence to acquire an image feature $F_{cover\_5\_1}$; inputting the image feature $F_{cover\_5\_1}$ into the second convolutional layer, the second BatchNorm layer, and the second ReLU activation function in the first branch of the second CPC module in sequence to acquire an image feature $F_{cover\_5\_2}$; inputting the image feature $F_{cover\_5\_2}$ into the third convolutional layer, the third BatchNorm layer, and the third ReLU activation function in the first branch of the second CPC module in sequence to acquire an image feature $F_{cover\_5\_3}$; inputting the image feature $F_{cover\_5}$ into the second branch of the second CPC module to acquire an image feature $F_{cover\_6}$; subjecting the image feature $F_{cover\_6}$ and the image feature $F_{cover\_5\_3}$ to element-wise multiplication to acquire an image feature $F_{cover\_7}$; subjecting the image feature $F_{cover\_7}$ and the image feature $F_{cover\_5}$ to corresponding-elements addition to acquire an image feature $F_{cover\_8}$; inputting the image feature $F_{cover\_8}$ into the first convolutional layer, the first BatchNorm layer, and the first ReLU activation function in the first branch of the third CPC module in sequence to acquire an image feature $F_{cover\_8\_1}$; inputting the image feature $F_{cover\_8\_1}$ into the second convolutional layer, the second BatchNorm layer, and the second ReLU activation function in the first branch of the third CPC module in sequence to acquire an image feature $F_{cover\_8\_2}$; inputting the image feature $F_{cover\_8\_2}$ into the third convolutional layer, the third BatchNorm layer, and the third ReLU activation function in the first branch of the third CPC module in sequence to acquire an image feature $F_{cover\_8\_3}$; inputting the image feature $F_{cover\_8}$ into the second branch of the third CPC module to acquire an image feature $F_{cover\_9}$; subjecting the image feature $F_{cover\_9}$ and the image feature $F_{cover\_8\_3}$ to element-wise multiplication to acquire an image feature $F_{cover\_10}$; and subjecting the image feature $F_{cover\_10}$ and the image feature $F_{cover\_8}$ corresponding-elements addition to acquire an image feature $F_{cover\_11}$;

c-4) constructing the watermark processing unit of the encoder, including a linear layer, a convolutional layer, a first BatchNorm layer, a first ReLU activation function, an atrous convolutional layer, a second ReLU activation function, a first Dropout layer, a first deconvolutional layer, a second BatchNorm layer, a third ReLU activation function, a second deconvolutional layer, a fourth ReLU activation function, a second Dropout layer, a first CPC module, a second CPC module, and a third CPC module; inputting the watermark $W_m$ into the linear layer of the watermark processing unit to acquire a watermark feature $f_1$; inputting the watermark feature $f_1$ into the convolutional layer, the first BatchNorm layer, and the first ReLU activation function of the watermark processing unit in sequence to acquire a watermark feature $f_2$; inputting the watermark feature $f_2$ into the atrous convolutional layer, the second ReLU activation function, and the first Dropout layer of the watermark processing unit in sequence to acquire a watermark feature $f_3$; inputting the watermark feature $f_3$ into the first deconvolutional layer, the second BatchNorm layer, and the third ReLU activation function of the watermark processing unit in sequence to acquire a watermark feature $f_4$; inputting the watermark feature $f_4$ into the second deconvolutional layer, the fourth ReLU activation function, and the second Dropout layer of the watermark processing unit in sequence to acquire a watermark feature $f_5$; inputting the watermark feature $f_5$ into the first convolutional layer, the first BatchNorm layer, and the first ReLU activation function in the first branch of the first CPC module in sequence to acquire a watermark feature $f_{m\_5\_1}$; inputting the watermark feature $f_{m\_5\_1}$ into the second convolutional layer, the second BatchNorm layer, and the second ReLU activation function in the first branch of the first CPC module in sequence to acquire a watermark feature $I_{m\_5\_2}$; inputting the watermark feature $f_{m\_5\_2}$ into the third convolutional layer, the third BatchNorm layer, and the third ReLU activation function in the first branch of the first CPC module in sequence to acquire a watermark feature $f_{m\_5\_3}$; inputting the watermark feature $f_5$ into the second branch of the first CPC module to acquire a watermark feature $f_{m\_6}$; subjecting the watermark feature $f_{m\_6}$ and the watermark feature $f_{m\_5\_3}$ to element-wise multiplication to acquire a watermark feature $f_{m\_7}$; subjecting the watermark feature $f_{m\_7}$ and the watermark feature $f_5$ to corresponding-elements addition to acquire a watermark feature $f_{m\_8}$; inputting the watermark feature $f_{m\_8}$ into the first convolutional layer, the first BatchNorm layer, and the first ReLU activation function in the first branch of the second CPC module in sequence to acquire a watermark feature $f_{m\_8\_1}$; inputting the watermark feature $I_{m\_8\_1}$ into the second convolutional layer, the second BatchNorm layer, and the second ReLU activation function in the first branch of the second CPC module in sequence to acquire a watermark feature $I_{m\_8\_2}$; inputting the watermark feature $f_{m\_8\_2}$ into the third convolutional layer, the third BatchNorm layer, and the third ReLU activation function in the first branch of the second CPC module in sequence to acquire a watermark feature $I_{m\_8\_3}$; inputting the watermark feature $f_{m\_8}$ into the second branch of the second CPC module to acquire a watermark feature $f_{m\_9}$; subjecting the watermark feature $f_{m\_9}$ and the watermark feature $f_{m\_8\_3}$ to element-wise multiplication to acquire a watermark feature $f_{m\_10}$; subjecting the watermark feature $f_{m\_10}$ and the watermark feature $f_{m\_8}$ to corresponding-elements addition to acquire a watermark feature $f_{m\_11}$; inputting the watermark feature $f_{m\_11}$ into the first convolutional layer, the first BatchNorm layer, and the first ReLU activation function in the first branch of the third CPC module in sequence to acquire a watermark feature $f_{m\_11\_1}$; inputting the watermark feature $fm_{m\_11\_1}$ into the second convolutional layer, the second BatchNorm layer, and the second ReLU activation function in the first branch of the third CPC module in sequence to acquire a watermark feature $f_{m\_11\_2}$; inputting the watermark feature $f_{m\_11\_2}$ into the third convolutional layer, the third BatchNorm layer, and the third ReLU activation function in the first branch of the third CPC module in sequence to acquire a watermark feature $f_{m\_11\_3}$; inputting the watermark feature $f_{m\_11}$ into the second branch of the third CPC module to acquire a watermark feature $f_{m\_12}$; subjecting the watermark feature $f_{m\_12}$ and the watermark feature $f_{m\_11\ 3}$ to element-wise multiplication to acquire a watermark feature $f_{m\_13}$; and subjecting the watermark feature $f_{m\_13}$ and the watermark feature $f_{m\_11}$ to corresponding-elements addition to acquire a watermark feature $f_6$; and c-5) subjecting the image feature $F_{cover\_11}$ and the watermark feature $f_6$ to corresponding-elements addition to acquire a feature $F_1$; inputting the feature F into the first convolutional layer, the BatchNorm layer, and the activation function layer of the encoder in sequence to acquire a feature $F_2$; and inputting the feature $F_2$ into the second convolutional layer of the encoder to acquire the watermark image $I_{wm}$.

Preferably, in the step c-2), the convolutional layer of the original image processing unit includes 64 channels and a convolutional kernel, with a size of 3, a stride of 1, and a padding of 1; and the atrous convolutional layer of the original image processing unit includes 64 channels and a convolutional kernel, with a size of 3, a dilation rate of 2, a stride of 1, and a padding of 1; in the step c-3), the first convolutional layer, the second convolutional layer, and the third convolutional layer in the first branch each include 64 channels and a convolutional kernel, with a size of 3, a stride of 1, and a padding of 1; the first convolutional layer and the second convolutional layer in the second branch each include 64 channels and a convolutional kernel, with a size of 3, a stride of 1, and a padding of 1; and the average pooling layer in the second branch has a window size of 4; in the step c-4), the linear layer of the watermark processing unit includes 256 input nodes and 256 output nodes; the convolutional layer of the watermark processing unit includes 64 channels and a convolutional kernel, with a size of 3, a stride of 1, and a padding of 1; the atrous convolutional layer of the watermark processing unit includes 64 channels and a convolutional kernel, with a size of 3, a dilation rate of 2, a stride of 1, and a padding of 1; and the first deconvolutional layer and the second deconvolutional layer of the watermark processing unit each include 64 channels and a convolutional kernel, with a size of 3, a stride of 1, and a padding of 1; in the step c-5), the first convolutional layer of the encoder includes 64 channels and a convolutional kernel, with a size of 3, a stride of 1, and a padding of 1; and the second convolutional layer of the encoder includes 3 channels and a convolutional kernel, with a size of 1, a stride of 1, and a padding of 1.

Further, the step d) includes:

d-1) constructing the noise pool, including Identity noise, Dropout noise, Crop noise, GaussianNoise noise, Salt-Pepper noise, GaussianBlur noise, MedBlur noise, and joint photographic experts group (JPEG) noise; injecting the watermark image $I_{wm}$ into the noise pool; and adding a noise randomly selected from the noise pool to the watermark image $I_{wm}$ to form the noise image $I_{noise}$, and d-2) constructing the malicious pool, including a simple swapping (SimSwap) model, an information bottleneck disentanglement for identity swapping (InfoSwap) model, a unified cross-entropy loss for deep face recognition (UniFace) model, and attribute manipulation algorithms; injecting the watermark image $I_{wm}$ into the malicious pool; and manipulating, by a model or attribute manipulation algorithm randomly selected from the malicious pool, the watermark image I to form the malicious image $I_{dep}$. wm Further, the step e) includes:

e-1) constructing the decoder, including a first convolutional layer, a first BatchNorm layer, a first ReLU activation function, a first atrous convolutional layer, a second ReLU activation function, a first Dropout layer, a first CPC module, a second CPC module, a third CPC module, a second convolutional layer, a second BatchNorm layer, a third ReLU activation function, a second atrous convolutional layer, a fourth ReLU activation function, a second Dropout layer, a flatten layer, and a fully connected layer; inputting the noise image I noise or the malicious image dep into the first convolutional layer, the first BatchNorm layer, and the first ReLU activation function of the decoder in sequence to acquire an image feature $N_1$; inputting the image feature N, into the first atrous convolutional layer, the second ReLU activation function, and the first Dropout layer of the decoder in sequence to acquire an image feature $N_2$; inputting the image feature $N_2$ into the first convolutional layer, the first BatchNorm layer, and the first ReLU activation function in the first branch of the first CPC module in sequence to acquire an image feature $N_2$ 1; inputting the image feature $N_2$ 1 into the second convolutional layer, the second BatchNorm layer, and the second ReLU activation function in the first branch of the first CPC module in sequence to acquire an image feature $N_{2\_2}$; inputting the image feature $N_{2\_2}$ into the third convolutional layer, the third BatchNorm layer, and the third ReLU activation function in the first branch of the first CPC module in sequence to acquire an image feature N 2_3; inputting the image feature $N_2$ into the second branch of the first CPC module to acquire an image feature $N_3$; subjecting the image feature $N_3$ and the image feature $N_{2\_3}$ to element-wise multiplication to acquire an image feature $N_4$; subjecting the image feature $N_4$ and the image feature $N_2$ to corresponding-elements addition to acquire an image feature $N_5$; inputting the image feature Ng into the first convolutional layer, the first BatchNorm layer, and the first ReLU activation function in the first branch of the second CPC module in sequence to acquire an image feature $N_{5\_1}$; inputting the image feature $N_{5\_1}$ into the second convolutional layer, the second BatchNorm layer, and the second ReLU activation function in the first branch of the second CPC module in sequence to acquire an image feature $N_{5\_2}$; inputting the image feature $N_{5\_2}$ into the third convolutional layer, the third BatchNorm layer, and the third ReLU activation function in the first branch of the second CPC module in sequence to acquire an image feature $N_{5\_3}$; inputting the image feature $N_5$ into the second branch of the second CPC module to acquire an image feature $N_6$; subjecting the image feature $N_6$ and the image feature $N_{5\_3}$ to element-wise multiplication to acquire an image feature $N_7$; subjecting the image feature N-and the image feature $N_5$ to corresponding-elements addition to acquire an image feature $N_8$; inputting the image feature $N_8$ into the first convolutional layer, the first BatchNorm layer, and the first ReLU activation function in the first branch of the third CPC module in sequence to acquire an image feature $N_{8\_1}$; inputting the image feature $N_8$ into the second convolutional layer, the second BatchNorm layer, and the second ReLU activation function in the first branch of the third CPC module in sequence to acquire an image feature $N_{8\_2}$; inputting the image feature $N_{8\_2}$ into the third convolutional layer, the third BatchNorm layer, and the third ReLU activation function in the first branch of the third CPC module in sequence to acquire an image feature $N_{8\_3}$; inputting the image feature $N_8$ into the second branch of the third CPC module to acquire an image feature No; subjecting the image feature $N_9$ and the image feature $N_{8\_3}$ to element-wise multiplication to acquire an image feature $N_{10}$; subjecting the image feature $N_{10}$ and the image feature $N_8$ to corresponding-elements addition to acquire an image feature $N_{11}$; inputting the image feature $N_{11}$ into the second convolutional layer, the second BatchNorm layer, and the third ReLU activation function of the decoder in sequence to acquire an image feature $N_{12}$; inputting the image feature $N_{12}$ into the second atrous convolutional layer, the fourth ReLU activation function, and the second Dropout layer of the decoder in sequence to acquire an image feature $N_{13}$; inputting the image feature $N_{13}$ into the flatten layer of the decoder to acquire an image feature $N_{14}$; and inputting the image feature $N_{14}$ into the fully connected layer of the decoder to acquire the final watermark $W_{ml}$.

Preferably, in the step e-1), the first convolutional layer of the decoder includes 64 channels and a convolutional kernel, with a size of 3, a stride of 1, and a padding of 1; the first atrous convolutional layer of the decoder includes 64 channels and a convolutional kernel, with a size of 3, a dilation rate of 2, a stride of 1, and a padding of 1; the second convolutional layer of the decoder includes 64 channels and a convolutional kernel, with a size of 3, a stride of 1, and a padding of 1; the second atrous convolutional layer of the decoder includes 64 channels and a convolutional kernel, with a size of 3, a dilation rate of 2, a stride of 1, and a padding of 1; and the flatten layer and the fully connected layer of the decoder each include 256 neurons.

Further, the step f) includes:

f-1) defining a constant count1 with an initial value of 0; determining whether binary values at corresponding positions of the final watermark $W_{ml}$ and the watermark $W_n$ are the same; and if the binary values of the final watermark $W_m$ and the watermark W are different in one bit: incrementing the constant count1 by 1, and dividing a final value of the constant count1 by 256 to acquire a bit error rate $E_{bit}$;

f-2) determining that the noise image $I_{noise}$ is a real image if the bit error rate $E_{bit}$ is less than 0.5; and determining that the noise image I noise is a fake image if the bit error rate $E_{bit}$ is greater than or equal to 0.5;

f-3) replacing the i-th facial image $I_{cover\_i}$ in the step b) with the malicious image $I_{dep}$, and repeating the step b) to acquire a watermark $W_m$'.

f-4) defining a constant count2 with an initial value of 0; determining whether binary values at corresponding positions of the watermark $W'_m$ and the watermark $W_m$ are the same; and if the binary values of the watermark $W_m$" and the watermark $W_m$ are different in one bit: incrementing the constant count2 by 1, and dividing a final value of the constant count2 by 256 to acquire a bit error rate $E'_{bit}$; and f-5) determining that the malicious image $I_{dep}$ is a real image if the bit error rate E;. is less than or equal to 0.5; and determining that the malicious image $I_{dep}$ is a fake image if the bit error rate $E_{bit}$ is greater than 0.5.

The present disclosure has the following beneficial effects. The present disclosure extracts facial landmarks from an original image and converts the extracted facial landmarks into a binary watermark. The present disclosure embeds the binary watermark into the original image to acquire a watermark image, allowing the watermark image to undergo a non-malicious/malicious operation to form a noise image or a malicious image. In this way, the model is robust to the non-malicious/malicious operation. The present disclosure introduces facial landmarks to generate a unique watermark for each individual and achieve traceability and detection functions.

DETAILED DESCRIPTION OF THE EMBODIMENTS

Figure 1:
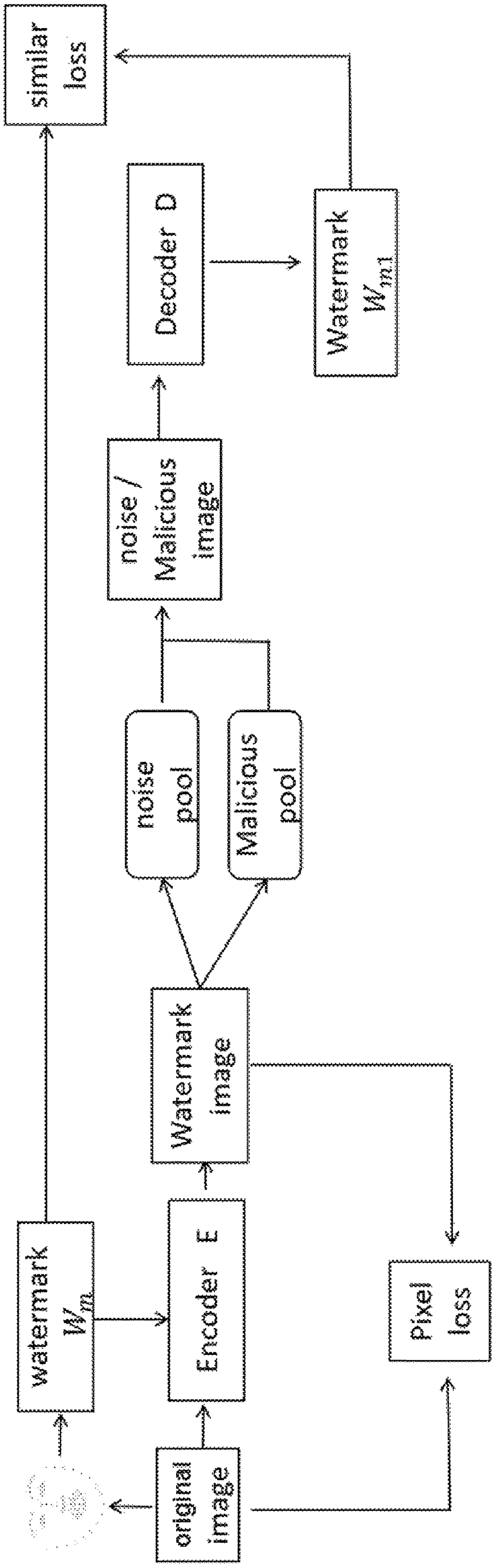
FIG. 1 is a flowchart of an active-defense detection method based on facial landmark watermarking according to the present disclosure.
Figure 2:
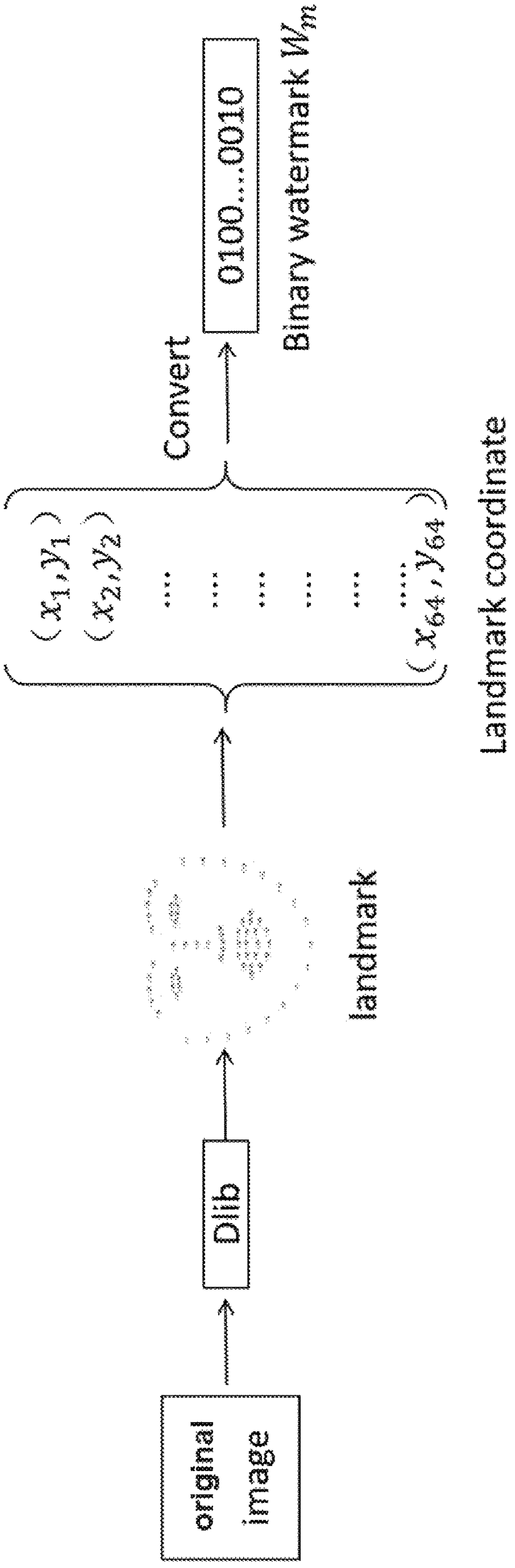
FIG. 2 is a structural diagram of landmark extraction according to the present disclosure.
Figure 3:
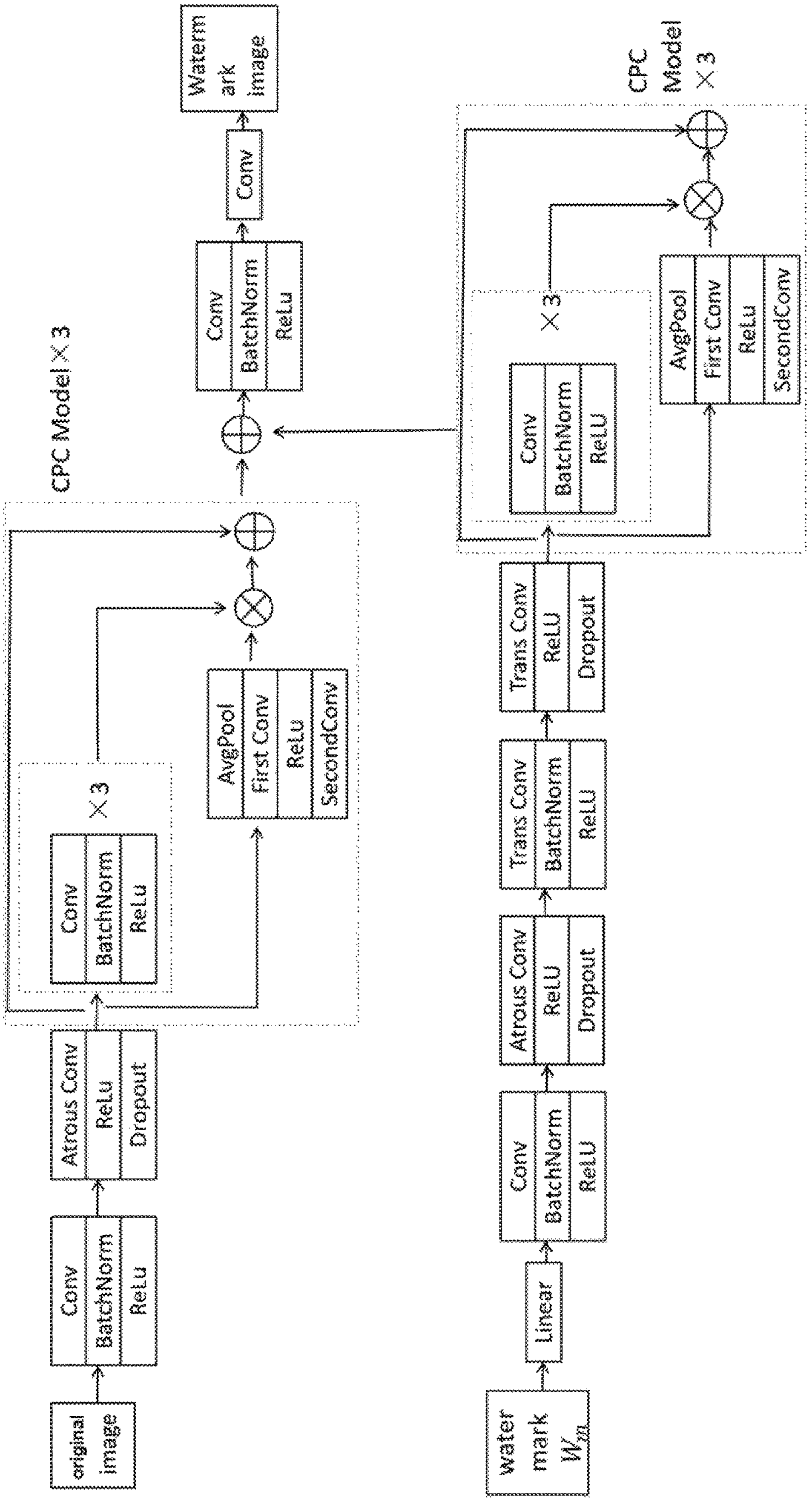
FIG. 3 is a structural diagram of an encoder according to the present disclosure.
Figure 4:
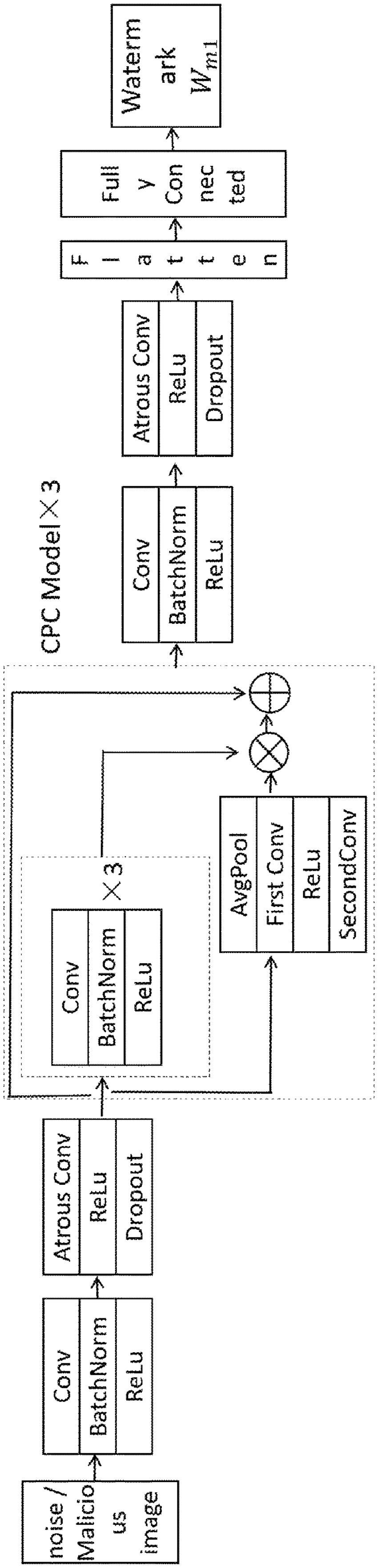
FIG. 4 is a structural diagram of a decoder according to the present disclosure.

The present disclosure is further described with reference to FIGS. 1 to 4.

An active-defense detection method based on facial landmark watermarking includes the following steps.

a) n facial images are acquired to form facial image set I, $I=\{I_1, I_2, \ldots, I_i, \ldots, I_n\}$, where $I_i$ denotes an i-th facial image, $i\in\{1, \ldots, n\}$ The i-th facial image $I_i$, i£={1, . . . ,n}, is preprocessed to acquire preprocessed i-th facial image $I_{cover\_i}$, thereby acquiring preprocessed facial image set $I_{cover}$.

b) Facial landmarks are extracted from the preprocessed i-th facial image $I_{cover\_i}$, and are converted is input into watermark $W_m$.

c) An encoder is constructed, and the i-th facial image $I_{cover\_i}$ and the watermark $W_m$ are input is input into the encoder to acquire watermark image $I_{wm}$.

d) The watermark image $I_{wm}$ is injected into a noise pool to acquire noise image I noise, and the watermark image wm I is injected into a malicious pool to acquire malicious image $I_{dep}$.

e) A decoder is constructed, and the noise image $I_{noise}$ or the malicious image $I_{dep}$ is input into the decoder to acquire final watermark $W''_{ml}$.

f) it is determined whether the noise image/noise and the malicious image $I_{dep}$ are real or fake images based on the final watermark $W_{ml}$.

The present disclosure converts the extracted facial landmarks is input into a binary watermark. The present disclosure embeds the binary watermark is input into the original image to acquire watermark image, allowing the watermark image to undergo a non-malicious/malicious operation to form noise image. In this way, the model is robust to the non-malicious/malicious operation. The present disclosure can generate a unique watermark for each individual and achieve traceability and detection functions. The present disclosure is based on the idea of adversarial attacks. Typically, active defense involves two methods. Firstly, adversarial perturbations are added to images or videos to distort the content generated by Deepfake, achieving the effect of "knowing it is fake at a glance". Secondly, adversarial watermarks are added to images or videos. Unlike adding perturbations, adding watermarks is done by training the robustness of the watermark. At present, in methods based on semi-fragile watermarks, a watermark can only detect authenticity and cannot achieve tracing. In addition, in methods based on robust watermarks, watermarks embed is input into the image are randomly generated or fixed watermarks, and unique watermarks cannot be generated for each individual.

In an embodiment of the present disclosure, the step a) is as follows.

a-1) The n facial images are acquired from a CelebA-HQ dataset to form the facial image set I. The CelebA-HQ dataset includes 30,000 facial images with different identities, each with a resolution of 1024*1024.

a-2) The i-th facial image $I_i$ is resized by a resize function in a Python® imaging library (PIL) into a 256×256 image, thereby acquiring the preprocessed i-th facial image $I_{cover}$ and acquiring the preprocessed facial image set $I_{cover}=\{I_{cover\_1}, I_{cover\_2}, \ldots, I_{cover\_i}, \ldots, I_{cover\_i} \ldots . I_{cover\_n}\}$.

In an embodiment of the present disclosure, the step b) is as follows.

b-1) The facial landmarks in the preprocessed i-th facial image $I_{cover\_i}$ are detected by a Dlib facial landmark detection algorithm to acquire facial landmark set L, m including m facial landmarks, $L_m=\{l_1, l_2, \ldots, l_m\}$, m=68, where $\{l_1, l_2, \ldots, l_{17}\}$ are landmarks of a jawline, $\{l_{18}, l_{19}, \ldots, l_{22}\}$ are landmarks of a right eyebrow, $\{l_{23}, l_{24}, \ldots, l_{27}\}$ are landmarks of a left eyebrow, $\{l_{28}, l_{29}, \ldots, l_{36}\}$ are landmarks of a nose, $\{l_{37}, l_{38}, \ldots, l_{42}\}$ are landmarks of a right eye, $\{l_{43}, l^{44}, \ldots, l_{48}\}$ are landmarks of a left eye, and $\{l_{49}, l_{50}, \ldots l_{68}\}$ are landmarks of a mouth.

b-2) i-th landmark $l_i$ is defined by horizontal coordinate $X_i$ and vertical coordinate $y_i$. A value of the horizontal coordinate X; is mapped to an integer range of 0-15 through a linear transformation, and the value is converted by a bin function in Python into binary representation $X_i$ W with a length of 4. A value of the vertical coordinate y; is mapped to an integer range of 0-15 through a linear transformation, and the value is converted by the bin function in Python® into binary representation $W_{yi}$ with a length of 4. The binary representation W and the binary representation $W_{Xiy}$ are spliced into binary representation $W_{xy\_i}$ with a length of 8. Binary representations of the 68 facial landmarks are spliced together input into binary representation $W_{68}$ with a length of 544. The binary representation W is 68 compressed by a principal component analysis (PCA)-based dimensionality reduction method to a binary representation with a length of 256 as the watermark Wn m In an embodiment of the present disclosure, the step c) is as follows. c-1) The encoder is constructed, including an original image processing unit, a watermark processing unit, a first convolutional layer, a batch normalization (BatchNorm) layer, an activation function layer, and a second convolutional layer.

c-2) The original image processing unit of the encoder is constructed, including a convolutional layer, a BatchNorm layer, a first rectified linear unit (ReLU) activation function, an atrous convolutional layer, a second ReLU activation function, a Dropout layer, a first CPC module, a second CPC module, and a third CPC module. The i-th facial image $I_{cover\_i}$ is input into the convolutional layer, the BatchNorm layer, and the first ReLU activation function of the original image processing unit in sequence to acquire image feature $F_{cover\_1}$. The image feature $F_{cover\_1}$ is input into the atrous convolutional layer, the second ReLU activation function, and the Dropout layer of the original image processing unit in sequence to acquire image feature $F_{cover\_2}$.

c-3) The first CPC module, the second CPC module, and the third CPC module are constructed, each including a first branch and a second branch, where the first branch includes a first convolutional layer, a first BatchNorm layer, a first ReLU activation function, a second convolutional layer, a second BatchNorm layer, a second ReLU activation function, a third convolutional layer, a third BatchNorm layer, and a third ReLU activation function in sequence, while the second branch includes an average pooling layer, a first convolutional layer, a ReLU activation function, and a second convolutional layer in sequence. The image feature $F_{cover\_2}$ is input into the first convolutional layer, the first BatchNorm layer, and the first ReLU activation function in the first branch of the first CPC module in sequence to acquire image feature $F_{cover\_2\_1}$. The image feature $F_{cover\_2\_1}$ is input into the second convolutional layer, the second BatchNorm layer, and the second ReLU activation function in the first branch of the first CPC module in sequence to acquire image feature $F_{cover\_2\_2}$. The image feature $F_{cover\_2\_2}$ is input into the third convolutional layer, the third BatchNorm layer, and the third ReLU activation function in the first branch of the first CPC module in sequence to acquire image feature $F_{cover\_2\_3}$. The image feature $F_{cover\_2}$ is input into the second branch of the first CPC module to acquire image feature $F_{cover\_3}$. The image feature $F_{cover\_3}$ and the image feature $F_{cover\_2\_3}$ are subjected to element-wise multiplication to acquire image feature $F_{c\_cover\_4}$. The image feature $F_{cover\_4}$ and the image feature $F_{cover\_2}$ are subjected to corresponding-elements addition to acquire image feature $F_{cover\_5}$. The image feature $F_{cover\_5}$ is input into the first convolutional layer, the first BatchNorm layer, and the first ReLU activation function in the first branch of the second CPC module in sequence to acquire image feature $F_{cover\_5}$ 1. The image feature $F_{cover\_5\_1}$ is input into the second convolutional layer, the second BatchNorm layer, and the second ReLU activation function in the first branch of the second CPC module in sequence to acquire image feature $F_{cover\_5\_2}$. The image feature $F_{cover\_5\_2}$ is input into the third convolutional layer, the third BatchNorm layer, and the third ReLU activation function in the first branch of the second CPC module in sequence to acquire image feature $F_{cover\_5\_3}$. The image feature $F_{cover\_5}$ is input into the second branch of the second CPC module to acquire image feature $F_{cover\_6}$. The image feature $F_{cover\_6}$ and the image feature $F_{cover\_5\_3}$ are subjected to element-wise multiplication to acquire image feature $F_{cover\_7}$. The image feature cover_7 and the image feature $F_{cover\_5}$ are subjected to corresponding-elements addition to F acquire image feature cover_8 The image feature $F_{cover\_8}$ is input into the first convolutional layer, the first BatchNorm layer, and the first ReLU activation function in the first branch of the third CPC module in sequence to acquire image feature $F_{cover\_8}$. The image feature $F_{cover\_8\_1}$ is input into the second convolutional layer, the second BatchNorm layer, and the second ReLU activation function in the first branch of the third CPC module in sequence to acquire image feature $F_{cover\_8\_2}$. The image feature $F_{cover\_8\_2}$ is input into the third convolutional layer, the third BatchNorm layer, and the third ReLU activation function in the first branch of the third CPC module in sequence to acquire image feature $F_{cover\_8\_3}$. The image feature $F_{cover\_8}$ is input into the second branch of the third CPC module to acquire image feature $F_{cover\_9}$. The image feature $F_{cover\_9}$ and the image feature $F_{cover\_8\_3}$ are subjected to element-wise multiplication to acquire image feature Fc cover_10.

The image feature cover 10 and the image feature $F_{cover8}$ are subjected to corresponding-elements addition to acquire image feature $F_{cover}$.

c-4) The watermark processing unit of the encoder is constructed, including a linear layer, a convolutional layer, a first BatchNorm layer, a first ReLU activation function, an atrous convolutional layer, a second ReLU activation function, a first Dropout layer, a first deconvolutional layer, a second BatchNorm layer, a third ReLU activation function, a second deconvolutional layer, a fourth ReLU activation function, a second Dropout layer, a first CPC module, a second CPC module, and a third CPC module. The watermark $W_m$ is input into the linear layer of the watermark processing unit to acquire watermark feature $f_1$. The watermark feature f is input into the convolutional layer, the first BatchNorm layer, and the first ReLU activation function of the watermark processing unit in sequence to acquire watermark feature $f_2$.

The watermark feature $f_2$ is input into the atrous convolutional layer, the second ReLU activation function, and the first Dropout layer of the watermark processing unit in sequence to acquire watermark feature $f_3$. The watermark feature $f_3$ is input into the first deconvolutional layer, the second BatchNorm layer, and the third ReLU activation function of the watermark processing unit in sequence to acquire watermark feature $f_4$. The watermark feature $f_4$ is input into the second deconvolutional layer, the fourth ReLU activation function, and the second Dropout layer of the watermark processing unit in sequence to acquire watermark feature $f_5$. The watermark feature $f_5$ is input into the first convolutional layer, the first BatchNorm layer, and the first ReLU activation function in the first branch of the first CPC module in sequence to acquire watermark feature $f_{m\_5\_1}$. The watermark feature $f_{m\_5\_1}$ is input into the second convolutional layer, the second BatchNorm layer, and the second ReLU activation function in the first branch of the first CPC module in sequence to acquire watermark feature $f_{m\_5\_2}$. The watermark feature $f_{m\_5\_2}$ is input into the third convolutional layer, the third BatchNorm layer, and the third ReLU activation function in the first branch of the first CPC module in sequence to acquire watermark feature $f_{m\_5\_3}$. The watermark feature $f_5$ is input into the second branch of the first CPC module to acquire watermark feature $f_{m6}$. The watermark feature $f_{m\_6}$ and the watermark feature $f_{5\_3}$ are subjected to element-wise multiplication to acquire watermark feature $f_{m\_7}$. The watermark feature $f_{m\_7}$ and the watermark feature $f_5$ are subjected to corresponding-elements addition to acquire watermark feature $f_{m\_8}$. The watermark feature $f_{m\_8}$ is input into the first convolutional layer, the first BatchNorm layer, and the first ReLU activation function in the first branch of the second CPC module in sequence to acquire watermark feature $f_{m\_8\_1}$. The watermark feature $f_{m\_8\_1}$ is input into the second convolutional layer, the second BatchNorm layer, and the second ReLU activation function in the first branch of the second CPC module in sequence to acquire watermark feature $f_{m\_8\_2}$. The watermark feature $f_{m\_8\_2}$ is input into the third convolutional layer, the third BatchNorm layer, and the third ReLU activation function in the first branch of the second CPC module in sequence to acquire watermark feature $f_{m\_m\_8\_3}$. The watermark feature $f_{m\_8}$ is input into the second branch of the second CPC module to acquire watermark feature $f_{m\_9}$. The watermark feature $f_{m\_9}$ and the watermark feature $f_{m\_8}$ 3 are subjected to element-wise multiplication to acquire watermark feature $f_{m\_10}$. The watermark feature $f_{m\_10}$ and the watermark feature $f_{m\_8}$ are subjected to corresponding-elements addition to acquire watermark feature $f_{m\_11}$. The watermark feature $f_{m\_11}$ is input into the first convolutional layer, the first BatchNorm layer, and the first ReLU activation function in the first branch of the third CPC module in sequence to acquire watermark feature $f_{m\_11\_1}$. The watermark feature $f_{m\_11\_1}$ is input into the second convolutional layer, the second BatchNorm layer, and the second ReLU activation function in the first branch of the third CPC module in sequence to acquire watermark feature $f_{m\_11\_2}$. The watermark feature $f_{m\_11\_2}$ is input into the third convolutional layer, the third BatchNorm layer, and the third ReLU activation function in the first branch of the third CPC module in sequence to acquire watermark feature $f_{m\_11\_3}$. The watermark feature $f_{m\_11}$ is input into the second branch of the third CPC module to acquire watermark feature $f_{m\_12}$. The watermark feature $f_{m\_12}$ and the watermark feature. $f_{m\_11\_3}$ are subjected to element-wise multiplication to acquire watermark feature $f_{m\_13}$. The watermark feature $f_{m\_13}$ and the watermark feature $f_{m\_11}$ are subjected to corresponding-elements addition to acquire watermark feature $f_6$.

c-5) The image feature $F_{cover\_11}$ and the watermark feature $f_6$ are subjected to corresponding-elements addition to acquire feature $F_1$. The feature $F_1$ is input into the first convolutional layer, the BatchNorm layer, and the activation function layer of the encoder in sequence to acquire feature $F_2$. The feature $F_2$ is input into the second convolutional layer of the encoder to acquire the watermark image $I_{wm}$.

In the encoder, all convolutional layers, deconvolutional layers, and atrous convolutional layers are two-dimensional.

In this embodiment, preferably, in the step c-2), the convolutional layer of the original image processing unit includes 64 channels and a convolutional kernel, with a size of 3, a stride of 1, and a padding of 1. The atrous convolutional layer of the original image processing unit includes 64 channels and a convolutional kernel, with a size of 3, a dilation rate of 2, a stride of 1, and a padding of 1. in the step c-3), the first convolutional layer, the second convolutional layer, and the third convolutional layer in the first branch each include 64 channels and a convolutional kernel, with a size of 3, a stride of 1, and a padding of 1. The first convolutional layer and the second convolutional layer in the second branch each include 64 channels and a convolutional kernel, with a size of 3, a stride of 1, and a padding of 1. The average pooling layer in the second branch has a window size of 4. In the step c-4), the linear layer of the watermark processing unit includes 256 input nodes and 256 output nodes. The convolutional layer of the watermark processing unit includes 64 channels and a convolutional kernel, with a size of 3, a stride of 1, and a padding of 1. The atrous convolutional layer of the watermark processing unit includes 64 channels and a convolutional kernel, with a size of 3, a dilation rate of 2, a stride of 1, and a padding of 1. The first deconvolutional layer and the second deconvolutional layer of the watermark processing unit each include 64 channels and a convolutional kernel, with a size of 3, a stride of 1, and a padding of 1. In the step c-5), the first convolutional layer of the encoder includes 64 channels and a convolutional kernel, with a size of 3, a stride of 1, and a padding of 1. The second convolutional layer of the encoder includes 3 channels and a convolutional kernel, with a size of 1, a stride of 1, and a padding of 1.

In an embodiment of the present disclosure, the step d) is as follows.

d-1) The noise pool is constructed, including Identity noise, Dropout noise, Crop noise, GaussianNoise noise, SaltPepper noise, GaussianBlur noise, MedBlur noise, and joint photographic experts group (JPEG) noise. The watermark image $I_{wm}$ is injected into the noise pool. A noise randomly selected from the noise pool is added to the watermark image $I_{wm}$ to form the noise image $I_{noise}$ By implementing the source code described in the paper "MBRS: Enhancing Robustness of DNN-based Watermarking by Mini-Batch of Real and Simulated joint photographic experts group (JPEG) Compression", the Identity noise, Dropout noise, Crop noise, GaussianNoise noise, SaltPepper noise, GaussianBlur noise, MedBlur noise, and joint photographic experts group (JPEG) noise are added. This is available in the prior art and will not be elaborated herein.

d-2) The malicious pool is constructed, including a simple swapping (SimSwap) model, an information bottleneck disentanglement for identity swapping (InfoSwap) model, a unified cross-entropy loss for deep face recognition (UniFace) model, and attribute manipulation algorithms (for manipulating nose, mouth, eyes, jawline, and eyebrow attributes). The watermark image $I_{wm}$ is injected into the malicious pool. The watermark image $I_{wm}$ is manipulated by a model or attribute manipulation algorithm randomly selected from the malicious pool to form the malicious image $I_{dep}$. The SimSwap model achieves face swapping through the source code described in the paper "SimSwap: An Efficient Framework for High Fidelity Face Swapping". The InfoSwap model achieves face swapping through the source code described in the paper "InfoSwap: Information Bottleneck Disentengement for Identity Swapping". The UniFace model achieves face swapping through the source code described in the paper "Designing One Unified Framework for High-Identity Face Reenactment and Swapping". The manipulating the shape of attributes such as nose, mouth, eyes, jawline, and eyebrows is achieved through the source code described in the paper "StarGAN: Unified Generative Adversarial Networks for Multi-Domain Image-to-Image Translation". This is available in the prior art and will not be elaborated herein.

In an embodiment of the present disclosure, the step e) is as follows.

e-1) The decoder is constructed, including a first convolutional layer, a first BatchNorm layer, a first ReLU activation function, a first atrous convolutional layer, a second ReLU activation function, a first Dropout layer, a first CPC module, a second CPC module, a third CPC module, a second convolutional layer, a second BatchNorm layer, a third ReLU activation function, a second atrous convolutional layer, a fourth ReLU activation function, a second Dropout layer, a flatten layer, and a fully connected layer. The noise image $I_{noise}$ or the malicious image $I_{dep}$ is input into the first convolutional layer, the first BatchNorm layer, and the first ReLU activation function of the decoder in sequence to acquire image feature $N_1$. The image feature Ny is input into the first atrous convolutional layer, the second ReLU activation function, and the first Dropout layer of the decoder in sequence to acquire image feature $N_2$. The image feature $N_2$ is input into the first convolutional layer, the first BatchNorm layer, and the first ReLU activation function in the first branch of the first CPC module in sequence to acquire image feature $N_2$ 1.

The image feature $N_{2\_1}$ is input into the second convolutional layer, the second BatchNorm layer, and the second ReLU activation function in the first branch of the first CPC module in sequence to acquire image feature $N_{2\_2}$. The image feature $N_{2\_2}$ is input into the third convolutional layer, the third BatchNorm layer, and the third ReLU activation function in the first branch of the first CPC module in sequence to acquire image feature $N_2$ 3. The image feature $N_2$ is input into the second branch of the first CPC module to acquire image feature $N_3$. The image feature $N_3$ and the image feature $N_2$ 3 are subjected to element-wise multiplication to acquire image feature $N_4$. The image feature $N_4$ and the image feature $N_2$ are subjected to corresponding-elements addition to acquire image feature $N_5$. The image feature $N_5$ is input into the first convolutional layer, the first BatchNorm layer, and the first ReLU activation function in the first branch of the second CPC module in sequence to acquire image feature $N_{5\_1}$. The image feature $N_{5\_1}$ is input into the second convolutional layer, the second BatchNorm layer, and the second ReLU activation function in the first branch of the second CPC module in sequence to acquire image feature $N_{5\_2}$. The image feature $N_{5\_2}$ is input into the third convolutional layer, the third BatchNorm layer, and the third ReLU activation function in the first branch of the second CPC module in sequence to acquire image feature $N_{5\_3}$. The image feature $N_8$ is input into the second branch of the second CPC module to acquire image feature $N_6$. The image feature $N_6$ and the image feature $N_5$ 3 are subjected to element-wise multiplication to acquire image feature $N_7$. The image feature $N_1$ and the image feature $N_5$ are subjected to corresponding-elements addition to acquire image feature $N_8$. The image feature Ng is input into the first convolutional layer, the first BatchNorm layer, and the first ReLU activation function in the first branch of the third CPC module in sequence to acquire image feature $N_{8\_1}$. The image feature $N_{8\_1}$ is input into the second convolutional layer, the second BatchNorm layer, and the second ReLU activation function in the first branch of the third CPC module in sequence to acquire image feature $N_{8\_2}$. The image feature $N_{8\_2}$ is input into the third convolutional layer, the third BatchNorm layer, and the third ReLU activation function in the first branch of the third CPC module in sequence to acquire image feature $N_{8\_3}$. The image feature Ng is input into the second branch of the third CPC module to acquire image feature No. The image feature Ng and the image feature $N_{8\_3}$ are subjected to element-wise multiplication to acquire image feature $N_{10}$. The image feature $N_{10}$ and the image feature Ng are subjected to corresponding-elements addition to acquire image feature $N_{11}$. The image feature $N_{11}$ is input into the second convolutional layer, the second BatchNorm layer, and the third ReLU activation function of the decoder in sequence to acquire image feature $N_{12}$. The image feature $N_{12}$ is input into the second atrous convolutional layer, the fourth ReLU activation function, and the second Dropout layer of the decoder in sequence to acquire image feature $N_{13}$. The image feature $N_{13}$ is input into the flatten layer of the decoder to acquire image feature $N_{14\ 14}$. The image feature $N_{14}$ is input into the fully connected layer of the decoder to acquire the final watermark $W_{ml}$.

In this embodiment, preferably, in the step e-1), the first convolutional layer of the decoder includes 64 channels and a convolutional kernel, with a size of 3, a stride of 1, and a padding of 1. The first atrous convolutional layer of the decoder includes 64 channels and a convolutional kernel, with a size of 3, a dilation rate of 2, a stride of 1, and a padding of 1. The second convolutional layer of the decoder includes 64 channels and a convolutional kernel, with a size of 3, a stride of 1, and a padding of 1. The second atrous convolutional layer of the decoder includes 64 channels and a convolutional kernel, with a size of 3, a dilation rate of 2, a stride of 1, and a padding of 1. The flatten layer and the fully connected layer of the decoder each include 256 neurons.

In an embodiment of the present disclosure, the step f) is as follows. f-1) Constant count1 is defined with an initial value of 0. It is determined whether the binary values at corresponding positions of the final watermark $W_{ml}$ and the watermark W m are the same. If the binary values of the final watermark $W_{ml}$ and the watermark $W_m$ are m different in one bit, it indicates that the binary values at corresponding positions of the final watermark $W_{ml}$ and the watermark $W_m$ are different. At this point, the constant count1 is incremented by 1, and a final value of the constant count1 is divided by 256 to acquire bit error rate $E_{bit}$.

f-2) If the bit error rate $E_{bit}$ is less than 0.5, it indicates that the final watermark $W_{ml}$ is the watermark W of the i-th facial image $I_{cover\_i}$, and the face in the i-th facial image $I_{cover\_i}$ does not change, achieving a traceability function. Therefore, the noise image $I_{noise}$ is a real image. If the bit error rate Eja is greater than or equal to 0.5, the noise image $I_{noise}$ is a fake image.

f-3) The malicious image $I_{dep}$ includes a trace of manipulation. Therefore, the i-th facial image $I_{cover\_i}$ in the step b) is replaced with the malicious image $I_{dep}$, and the step b) is repeated to acquire watermark $W'_m$.

f-4) Constant count2 is defined with an initial value of 0. It is determined whether binary values at corresponding positions of the watermark $W'_m$ and the watermark $W_m$ are the same. If the binary values of the watermark $W'_m$ and the watermark $W_m$ are different in one bit, the constant count2 is incremented by 1, and a final value of the constant count2 is divided by 256 to acquire bit error rate $E'_{bit}$.

f-5) It is determined that the malicious image $I_{dep}$ is a real image if the bit error rate $E'_{bit}$ is less than or equal to 0.5. It is determined that the malicious image $I_{dep}$ is a fake image if the bit error rate $E'_{bit}$ is greater than 0.5. Since the watermark in the malicious image $I_{dep}$ can be robustly recovered from the decoder, the trustworthy original image with the watermark $W_m$ can be tracked through matching between facial landmarks and the watermark.

The quantitative comparison results of the bitwise restoration accuracy of watermarks after a common image processing operation and a malicious face swapping operation on the CelebA-HQ dataset at 256×256 resolution are shown in Table 1. The robustness of watermarks is measured based on the accuracy of watermark restoration. The method proposed by the present disclosure achieves an average accuracy of 98.95% in the common image processing operation, which is superior to the state-of-the-art methods. The average accuracy of the method proposed by the present disclosure is improved by 14.29% compared to MBRS and 18.56% compared to FaceSigns. The generalization ability of different face swapping algorithms is evaluated. The method proposed by the present disclosure restores watermarks with an average accuracy of 98.05%, which is improved by 47.82% compared to MBRS and 47.94% compared to FaceSigns.

Finally, it should be noted that the above descriptions are only preferred embodiments of the present disclosure, and are not intended to limit the present disclosure. Although the present disclosure has been described in detail with reference to the foregoing embodiments, those skilled in the art may still modify the technical solutions described in the foregoing embodiments, or equivalently substitute some technical features thereof. Any modification, equivalent substitution, improvement, etc. within the spirit and principles of the present disclosure shall fall within the scope of protection of the present disclosure.

What is claimed is:

1. An active-defense detection method based on a facial landmark watermarking, comprising:

a) acquiring n facial images to form a facial image set I, $I=\{I_1, I_2, \ldots, I_i \ldots, I_n\}$, wherein I; denotes an i-th facial image, $i\in\{1, \ldots, n\}$; and preprocessing the i-th facial image $I_i$, $i\in=\{1, \ldots, n\}$, to acquire a preprocessed i-th facial image $I_{cover\_i}$, wherein a preprocessed facial image set $I_{cover}$ is acquired;

b) extracting facial landmarks from the preprocessed i-th facial image $I_{cover\_i}$, and converting the facial landmarks into a watermark $W_m$;

c) constructing an encoder, and inputting the i-th facial image $I_{cover\_i}$ and the watermark $W_m$ into the encoder to acquire a watermark image $I_{wm}$;

d) injecting the watermark image $I_{wm}$ into a noise pool to acquire a noise image $I_{noise}$, and injecting the watermark image $I_{wm}$ into a malicious pool to acquire a malicious image $I_{dep}$;

e) constructing a decoder, and inputting the noise image I noise or the malicious image $I_{dep}$ into the decoder to acquire a final watermark $W_{ml}$;

f) determining whether the noise image $I_{noise}$ and the malicious image dep are real or fake images based on the final watermark $W_{ml}$; and wherein b) comprises:

b-1) detecting, by a Dlib facial landmark detection algorithm, the facial landmarks in the preprocessed i-th facial image $I_{cover}$; to acquire a facial landmark set $L_m$ comprising m facial landmarks, $L_m=\{l_1, l_2, \ldots, l_{22}\}$, m=68, wherein $\{l_1, l_2, \ldots, l_{17}\}$ are landmarks of a jawline, $\{l_{18}, l_{19}, \ldots l_m\}$ are landmarks of a right eyebrow, $\{l_{23}, l_{24}, \ldots l_{27}\}$, are landmarks of a left eyebrow, $\{l_{28}, l_{29}, \ldots l_{30}\}$ are landmarks of a nose, $\{l_{37}, l_{38}, \ldots l_{39}\}$are landmarks of a right eye, $\{l_{43}, l_{44}, \ldots l_{48}\}$ are landmarks of a left eye, and $\{l_{49}, l_{50}, \ldots l_{68}\}$ are landmarks of a mouth; and b-2) defining an i-th landmark $l_i$ by a horizontal coordinate $x_i$ and a vertical coordinate $y_i$; mapping a value of the horizontal coordinate $X_i$ to an integer range of 0-15 through a linear transformation, and converting, by a bin function in Python®, the value of the horizontal coordinate $x_i$ that is mapped to the integer range of 0-15 into a binary representation $W_{x_i}$ with a length of 4; mapping a value of the vertical coordinate $y_i$ to the integer range of 0-15 through the linear transformation, and converting, by the bin function in Python®, the value of the vertical coordinate $y_i$ that is mapped to the integer range of 0-15 into a binary representation $W_{y_i}$ with the length of 4; splicing the binary representation $W_{x_i}$ and the binary representation $W_{y_i}$ into a binary representation $W_{xy\_i}$ with a length of 8; splicing binary representations of the 68 facial landmarks together into a binary representation $W_{68}$ with a length of 544; and compressing, by a principal component analysis (PCA)-based dimensionality reduction method, the binary representation $W_{68}$ to a binary representation with a length of 256 as the watermark $W_m$.

2. The active-defense detection method based on the facial landmark watermarking according to claim 1, wherein a) comprises:

a-1) acquiring the n facial images from a CelebA-HQ dataset to form the facial image set I; and a-2) resizing, by a resize function in a Python imaging library (PIL), the i-th facial image $I_i$ into a 256×256 image, wherein the preprocessed i-th facial image $I_{cover\_i}$ and the preprocessed facial image set $I_{cover}=\{I_{cover\_1}, I_{cover\_2}, \ldots, I_{cover\_i}, \ldots, I_{cover\_n}\}$ are acquired.

3. The active-defense detection method based on the facial landmark watermarking according to claim 1, wherein the step-c) comprises:

c-1) constructing the encoder, comprising an original image processing unit, a watermark processing unit, a first convolutional layer, a batch normalization (BatchNorm) layer, an activation function layer, and a second convolutional layer;

c-2) constructing the original image processing unit of the encoder, comprising a convolutional layer, a BatchNorm layer, a first rectified linear unit (ReLU) activation function, an atrous convolutional layer, a second ReLU activation function, a Dropout layer, a first combined pooling and convolution (CPC) module, a second CPC module, and a third CPC module; inputting the i-th facial image $I_{cover\_i}$ into the convolutional layer, the BatchNorm layer, and the first ReLU activation function of the original image processing unit in sequence to acquire an image feature $F_{cover\_1}$; and inputting the image feature $F_{cover\_1}$ into the atrous convolutional layer, the second ReLU activation function, and the Dropout layer of the original image processing unit in sequence to acquire an image feature $F_{cover\_2}$, c-3) constructing the first CPC module, the second CPC module, and the third CPC module, each comprising a first branch and a second branch, wherein the first branch comprises a first convolutional layer, a first BatchNorm layer, a first ReLU activation function, a second convolutional layer, a second BatchNorm layer, a second ReLU activation function, a third convolutional layer, a third BatchNorm layer, and a third ReLU activation function in sequence, while the second branch comprises an average pooling layer, a first convolutional layer, a ReLU activation function, and a second convolutional layer in sequence; inputting the image feature $F_{cover\_2}$ into the first convolutional layer, the first BatchNorm layer, and the first ReLU activation function in the first branch of the first CPC module in sequence to acquire an image feature $F_{cover\_2\_1}$; inputting the image feature $F_{cover\_2\_1}$ into the second convolutional layer, the second BatchNorm layer, and the second ReLU activation function in the first branch of the first CPC module in sequence to acquire an image feature $F_{cover\_2\_2}$; inputting the image feature $F_{cover\_2\_2}$ into the third convolutional layer, the third BatchNorm layer, and the third ReLU activation function in the first branch of the first CPC module in sequence to acquire an image feature $F_{cover\_2\_3}$; inputting the image feature $F_{cover\_2}$ into the second branch of the first CPC module to acquire an image feature $F_{cover\_3}$; subjecting the image feature $F_{cover\_3}$ and the image feature $F_{cover\_2\_3}$ to element-wise multiplication to acquire an image feature $F_{cover\_4}$; subjecting the image feature $F_{cover\_4}$ and the image feature $F_{cover\_2}$ to corresponding-elements addition to acquire an image feature $F_{cover\_5}$; inputting the image feature $F_{cover\_5}$ into the first convolutional layer, the first BatchNorm layer, and the first ReLU activation function in the first branch of the second CPC module in sequence to acquire an image feature $F_{cover\_5\_1}$; inputting the image feature $F_{cover\_5\_1}$ into the second convolutional layer, the second BatchNorm layer, and the second ReLU activation function in the first branch of the second CPC module in sequence to acquire an image feature $F_{cover\_5\_2}$; inputting the image feature $F_{cover\_5\_2}$ into the third convolutional layer, the third BatchNorm layer, and the third ReLU activation function in the first branch of the second CPC module in sequence to acquire an image feature $F_{cover\_5\_3}$; inputting the image feature $F_{cover\_5}$ into the second branch of the second CPC module to acquire an image feature $F_{cover\_6}$, subjecting the image feature $F_{cover\_6}$ and the image feature $F_{cover\_5\_3}$ to the element-wise multiplication to acquire an image feature $F_{cover\_7}$; subjecting the image feature $F_{cover\_7}$ and the image feature $F_{cover\_5}$ to the corresponding-elements addition to acquire an image feature $F_{cover\_8}$; inputting the image feature $F_{cover\_8}$ into the first convolutional layer, the first BatchNorm layer, and the first ReLU activation function in the first branch of the third CPC module in sequence to acquire an image feature $F_{cover\_8\_1}$; inputting the image feature $F_{cover\_8\_1}$ into the second convolutional layer, the second BatchNorm layer, and the second ReLU activation function in the first branch of the third CPC module in sequence to acquire an image feature $F_{cover\_8\_2}$; inputting the image feature $F_{cover\_8\_2}$ into the third convolutional layer, the third BatchNorm layer, and the third ReLU activation function in the first branch of the third CPC module in sequence to acquire an image feature $F_{cover\_8\_3}$; inputting the image feature $F_{cover\_8}$ into the second branch of the third CPC module to acquire an image feature $F_{cover\_9}$; subjecting the image feature $F_{cover\_9}$ and the image feature $F_{cover\_8\_3}$ to the element-wise multiplication to acquire an image feature $F_{cover\_10}$; and subjecting the image feature $F_{cover\_10}$ and the image feature $F_{cpver\_8}$ to the corresponding-elements addition to acquire an image feature $F_{cover\_11}$, c-4) constructing the watermark processing unit of the encoder, comprising a linear layer, a convolutional layer, a first BatchNorm layer, a first ReLU activation function, an atrous convolutional layer, a second ReLU activation function, a first Dropout layer, a first deconvolutional layer, a second BatchNorm layer, a third ReLU activation function, a second deconvolutional layer, a fourth ReLU activation function, a second Dropout layer, a first CPC module, a second CPC module, and a third CPC module; inputting the watermark $_{Wm}$ into the linear layer of the watermark processing unit to acquire a watermark feature $f_1$; inputting the watermark feature $f_1$ into the convolutional layer, the first BatchNorm layer, and the first ReLU activation function of the watermark processing unit in sequence to acquire a watermark feature $f_2$; inputting the watermark feature $f_2$ into the atrous convolutional layer, the second ReLU activation function, and the first Dropout layer of the watermark processing unit in sequence to acquire a watermark feature $f_3$; inputting the watermark feature $f_3$ into the first deconvolutional layer, the second BatchNorm layer, and the third ReLU activation function of the watermark processing unit in sequence to acquire a watermark feature $f_4$; inputting the watermark feature $f_4$ into the second deconvolutional layer, the fourth ReLU activation function, and the second Dropout layer of the watermark processing unit in sequence to acquire a watermark feature $f_5$; inputting the watermark feature $f_5$ into the first convolutional layer, the first BatchNorm layer, and the first ReLU activation function in the first branch of the first CPC module in sequence to acquire a watermark feature $f_{m\_5\_1}$; inputting the watermark feature $f_{m\_5\_1}$ into the second convolutional layer, the second BatchNorm layer, and the second ReLU activation function in the first branch of the first CPC module in sequence to acquire a watermark feature $f_{m\_5\_2}$; inputting the watermark feature $f_{m\_5\_2}$ into the third convolutional layer, the third BatchNorm layer, and the third ReLU activation function in the first branch of the first CPC module in sequence to acquire a watermark feature $f_{m\_5\_3}$; inputting the watermark feature $f_5$ into the second branch of the first CPC module to acquire a watermark feature $f_{m\_6}$; subjecting the watermark feature $f_{m\_6}$ and the watermark feature $f_{m\_5\_3}$ to the element-wise multiplication to acquire a watermark feature $f_{m\_7}$; subjecting the watermark feature $f_{m\_7}$ and the watermark feature $f_5$ to the corresponding-elements addition to acquire a watermark feature $f_{m\_8}$; inputting the watermark feature $f_{m\_8}$ into the first convolutional layer, the first BatchNorm layer, and the first ReLU activation function in the first branch of the second CPC module in sequence to acquire a watermark feature 8_1; inputting the watermark feature $f_{m\_8\_1}$ into the second convolutional layer, the second BatchNorm layer, and the second ReLU activation function in the first branch of the second CPC module in sequence to acquire a watermark feature $f_{m\_8\_2}$; inputting the watermark feature $f_{m\_8}$ 2 into the third convolutional layer, the third BatchNorm layer, and the third ReLU activation function in the first branch of the second CPC module in sequence to acquire a watermark feature $f_{m\_8\_3}$; inputting the watermark feature $f_{m\_8}$ into the second branch of the second CPC module to acquire a watermark feature $f_{m\_9}$;

subjecting the watermark feature $f_{m\_9}$ and the watermark feature $f_{m\_8\_3}$ to the element-wise multiplication to acquire a watermark feature $f_{m\_10}$; subjecting the watermark feature $f_{m\_10}$ and the watermark feature $f_{m\_8}$ to the corresponding-elements addition to acquire a watermark feature $f_{m\_11}$; inputting the watermark feature $f_{m\_11}$ into the first convolutional layer, the first BatchNorm layer, and the first ReLU activation function in the first branch of the third CPC module in sequence to acquire a watermark feature $f_{m\_11\_1}$; inputting the watermark feature $f_{m\_11\_1}$ into the second convolutional layer, the second BatchNorm layer, and the second ReLU activation function in the first branch of the third CPC module in sequence to acquire a watermark feature $f_{m\_11\_2}$; inputting the watermark feature $f_{m\_11\_2}$ into the third convolutional layer, the third BatchNorm layer, and the third ReLU activation function in the first branch of the third CPC module in sequence to acquire a watermark feature $f_{m\_11\_3}$; inputting the watermark feature $f_{m\_11}$ into the second branch of the third CPC module to acquire a watermark feature $f_{m\_12}$; subjecting the watermark feature $f_{m\_12}$ and the watermark to the element-wise multiplication to acquire a watermark feature feature $f_{m\_13}$; and subjecting the watermark feature $f_{m\_13}$ and the watermark feature $f_{m\_11}$ to the corresponding-elements addition to acquire a watermark feature $f_6$; and c-5) subjecting the image feature $F_{cover\_11}$ and the watermark feature f, to the corresponding-elements addition to acquire a feature $F_1$; inputting the feature Fr into the first convolutional layer, the BatchNorm layer, and the activation function layer of the encoder in sequence to acquire a feature $F_2$; and inputting the feature $F_2$ into the second convolutional layer of the encoder to acquire the watermark image $I_{wm}$.

4. The active-defense detection method based on the facial landmark watermarking according to claim 3, wherein in c-2), the convolutional layer of the original image processing unit comprises 64 channels and a convolutional kernel, with a size of 3, a stride of 1, and a padding of 1; and the atrous convolutional layer of the original image processing unit comprises 64 channels and a convolutional kernel, with a size of 3, a dilation rate of 2, a stride of 1, and a padding of 1;

in c-3), the first convolutional layer, the second convolutional layer, and the third convolutional layer in the first branch each comprise 64 channels and a convolutional kernel, with a size of 3, a stride of 1, and a padding of 1; the first convolutional layer and the second convolutional layer in the second branch each comprise 64 channels and a convolutional kernel, with a size of 3, a stride of 1, and a padding of 1; and the average pooling layer in the second branch has a window size of 4;

in c-4), the linear layer of the watermark processing unit comprises 256 input nodes and 256 output nodes; the convolutional layer of the watermark processing unit comprises 64 channels and a convolutional kernel, with a size of 3, a stride of 1, and a padding of 1; the atrous convolutional layer of the watermark processing unit comprises 64 channels and a convolutional kernel, with a size of 3, a dilation rate of 2, a stride of 1, and a padding of 1; and the first deconvolutional layer and the second deconvolutional layer of the watermark processing unit each comprise 64 channels and a convolutional kernel, with a size of 3, a stride of 1, and a padding of 1; and in c-5), the first convolutional layer of the encoder comprises 64 channels and a convolutional kernel, with a size of 3, a stride of 1, and a padding of 1; and the second convolutional layer of the encoder comprises 3 channels and a convolutional kernel, with a size of 1, a stride of 1, and a padding of 1.

5. The active-defense detection method based on the facial landmark watermarking according to claim 1, wherein d) comprises:

d-1) constructing the noise pool, comprising Identity noise, Dropout noise, Crop noise, GaussianNoise noise, SaltPepper noise, GaussianBlur noise, MedBlur noise, and joint photographic experts group (JPEG) noise; injecting the watermark image $I_{wm}$ into the noise pool; and adding a noise randomly selected from the noise pool to the watermark image $I_{wm}$ to form the noise image $I_{noise}$; and d-2) constructing the malicious pool, comprising a simple swapping (SimSwap) model, an information bottleneck disentanglement for identity swapping (InfoSwap) model, a unified cross-entropy loss for deep face recognition (UniFace) model, and attribute manipulation algorithms; injecting the watermark image $I_{wm}$ into the malicious pool; and manipulating, by a model or attribute manipulation algorithm randomly selected from the malicious pool, the watermark image $I_{wm}$ to form the malicious image $I_{dep}$.

6. The active-defense detection method based on the facial landmark watermarking according to claim 3, wherein e) comprises:

e-1) constructing the decoder, comprising a first convolutional layer, a first BatchNorm layer, a first ReLU activation function, a first atrous convolutional layer, a second ReLU activation function, a first Dropout layer, a first CPC module, a second CPC module, a third CPC module, a second convolutional layer, a second BatchNorm layer, a third ReLU activation function, a second atrous convolutional layer, a fourth ReLU activation function, a second Dropout layer, a flatten layer, and a fully connected layer;

inputting the noise image $I_{noise}$ or the malicious image $I_{dep}$ into the first convolutional layer, the first BatchNorm layer, and the first ReLU activation function of the decoder in sequence to acquire an image feature $N_1$;

inputting the image feature $N_1$ into the first atrous convolutional layer, the second ReLU activation function, and the first Dropout layer of the decoder in sequence to acquire an image feature $N_2$;

inputting the image feature N, into the first convolutional layer, the first BatchNorm layer, and the first ReLU activation function in the first branch of the first CPC module in sequence to acquire an image feature $N_{2\_1}$;

inputting the image feature $N_{2\_1}$ into the second convolutional layer, the second BatchNorm layer, and the second ReLU activation function in the first branch of the first CPC module in sequence to acquire an image feature $N_{2\_2}$;

inputting the image feature $N_{2\_2}$ into the third convolutional layer, the third BatchNorm layer, and the third ReLU activation function in the first branch of the first CPC module in sequence to acquire an image feature $N_{2\_3}$;

inputting the image feature $N_2$ into the second branch of the first CPC module to acquire an image feature $N_3$;

subjecting the image feature $N_3$ and the image feature $N_{2\_3}$ to the element-wise multiplication to acquire an image feature $N_4$;

subjecting the image feature $N_4$ and the image feature $N_2$ to the corresponding-elements addition to acquire an image feature $N_5$;

inputting the image feature $N_5$ into the first convolutional layer, the first BatchNorm layer, and the first ReLU activation function in the first branch of the second CPC module in sequence to acquire an image feature $N_{5\_1}$;

inputting the image feature $N_{5\_1}$ into the second convolutional layer, the second BatchNorm layer, and the second ReLU activation function in the first branch of the second CPC module in sequence to acquire an image feature $N_{5\_2}$;

inputting the image feature $N_{5\_2}$ into the third convolutional layer, the third BatchNorm layer, and the third ReLU activation function in the first branch of the second CPC module in sequence to acquire an image feature $N_{5\_3}$;

inputting the image feature $N_5$ into the second branch of the second CPC module to acquire an image feature $N_6$;

subjecting the image feature $N_6$ and the image feature $N_{5\_3}$ to the element-wise multiplication to acquire an image feature $N_7$;

subjecting the image feature $N_7$ and the image feature $N_5$ to the corresponding-elements addition to acquire an image feature $N_8$;

inputting the image feature $N_8$ into the first convolutional layer, the first BatchNorm layer, and the first ReLU activation function in the first branch of the third CPC module in sequence to acquire an image feature $N_{8\_1}$;

inputting the image feature $N_{8\_1}$ into the second convolutional layer, the second BatchNorm layer, and the second ReLU activation function in the first branch of the third CPC module in sequence to acquire an image feature $N_{8\_2}$;

inputting the image feature $N_{8\_2}$ into the third convolutional layer, the third BatchNorm layer, and the third ReLU activation function in the first branch of the third CPC module in sequence to acquire an image feature $N_{8\_3}$;

inputting the image feature Ng into the second branch of the third CPC module to acquire an image feature $N_9$;

subjecting the image feature Ng and the image feature $N_{8\_3}$ to the element-wise multiplication to acquire an image feature $N_{10}$;

subjecting the image feature $N_{10}$ and the image feature $N_8$ to the corresponding-elements addition to acquire an image feature $N_{11}$;

inputting the image feature $N_{11}$ into the second convolutional layer, the second BatchNorm layer, and the third ReLU activation function of the decoder in sequence to acquire an image feature $N_{12}$;

inputting the image feature $N_{12}$ into the second atrous convolutional layer, the fourth ReLU activation function, and the second Dropout layer of the decoder in sequence to acquire an image feature $N_{13}$;

inputting the image feature $N_{13}$ into the flatten layer of the decoder to acquire an image feature $N_{14}$; and inputting the image feature $N_{14}$ into the fully connected layer of the decoder to acquire the final watermark $W_{ml}$.

7. The active-defense detection method based on the facial landmark watermarking according to claim 6, wherein in e-1), the first convolutional layer of the decoder comprises 64 channels and a convolutional kernel, with a size of 3, a stride of 1, and a padding of 1;

the first atrous convolutional layer of the decoder comprises 64 channels and a convolutional kernel, with a size of 3, a dilation rate of 2, a stride of 1, and a padding of 1;

the second convolutional layer of the decoder comprises 64 channels and a convolutional kernel, with a size of 3, a stride of 1, and a padding of 1;

the second atrous convolutional layer of the decoder comprises 64 channels and a convolutional kernel, with a size of 3, a dilation rate of 2, a stride of 1, and a padding of 1; and the flatten layer and the fully connected layer of the decoder each comprise 256 neurons.

8. The active-defense detection method based on the facial landmark watermarking according to claim 1, wherein f) comprises:

f-1) defining a constant count1 with an initial value of 0; determining whether binary values at corresponding positions of the final watermark $W_{ml}$ and the watermark m are the same; and when the binary values of the final watermark $W_{ml}$ and the watermark $W_m$ are different in one bit: incrementing the constant count1 by 1, and dividing a final value of the constant count1 by 256 to acquire a bit error rate $E_{bit}$;

f-2) determining that the noise image $I_{noise}$ is a real image when the bit error rate $E_{bit}$ is less than 0.5; and determining that the noise image I noise is a fake image when the bit error rate $E_{bit}$ is greater than or equal to 0.5;

f-3) replacing the i-th facial image $I_{cover\_i}$ in the step-b) with the malicious image $I_{dep}$, and repeating the step-b) to acquire a watermark $W'_m$;

f-4) defining a constant count2 with an initial value of 0; determining whether binary values at corresponding positions of the watermark $W_m$' and the watermark $W_m$ are the same; and when the binary values of the watermark W" and the watermark $W_m$ are different in one bit: incrementing the constant count2 by 1, and dividing a final value of the constant count2 by 256 to acquire a bit error rate $E'_{bit}$; and f-5) determining that the malicious image $I_{dep}$ is a real image when the bit error rate $E'_{bit}$ is less than or equal to 0.5; and determining that the malicious image $I_{dep}$ is a fake image when the bit error rate $E'_{bit}$ is greater than 0.5.

* * * * *